US009470802B2

(12) United States Patent
Okada et al.

(10) Patent No.: US 9,470,802 B2
(45) Date of Patent: Oct. 18, 2016

(54) RADIOGRAPHIC IMAGE CAPTURING APPARATUS AND CONTROL METHOD THEREOF (71) Applicant: CANON KABUSHIKI KAISHA, Tokyo (JP)

(72) Inventors: Hideyuki Okada, Honjo (JP); Toshio Kameshima, Kumagaya (JP); Tomoyuki Yagi, Honjo (JP); Katsuro Takenaka, Honjo (JP); Atsushi Iwashita, Saitama (JP); Eriko Sato, Tokyo (JP); Takuya Ryu, Kokbunji (JP); Kosuke Terui, Honjo (JP)

(73) Assignee: CANON KABUSHIKI KAISHA, TOKYO (JP)

( * ) Notice: Subject to any disclaimer, the term of this patent is extended or adjusted under 35 U.S.C. 154(b) by 0 days.

(21) Appl. No.: 14/714,600

(22) Filed: May 18, 2015

(65) Prior Publication Data
US 2015/0338530 A1    Nov. 26, 2015

(30) Foreign Application Priority Data

May 26, 2014 (JP) ................................. 2014-108443

(51) Int. Cl.
G01T 1/208    (2006.01)
H04N 5/361    (2011.01)

(52) U.S. Cl.
CPC ............... G01T 1/208 (2013.01); H04N 5/361 (2013.01)

(58) Field of Classification Search
CPC ............................... G01T 1/208; H04N 5/361
See application file for complete search history.

(56) References Cited

U.S. PATENT DOCUMENTS

| 7,386,089 | B2 | 6/2008 | Endo et al. ........................ 378/5 |
| 7,408,167 | B2 | 8/2008 | Kameshima et al. ... 250/370.09 |
| 7,732,776 | B2 | 6/2010 | Takenaka et al. ............. 250/369 |
| 7,869,568 | B2 | 1/2011 | Yokoyama et al. ......... 378/98.8 |
| 7,965,817 | B2 | 6/2011 | Kameshima et al. ....... 378/98.8 |
| 9,048,154 | B2 | 6/2015 | Takenaka et al. .................. H01L 27/14612 |
| 9,134,432 | B2 | 9/2015 | Iwashita et al. .......... G01T 1/16 |
| 2002/0186813 | A1* | 12/2002 | Tamura .................. H04N 5/321 378/98.8 |
| 2007/0125952 | A1* | 6/2007 | Endo ......................... G01T 1/17 250/369 |
| 2010/0195796 | A1* | 8/2010 | Takahashi ............... H01J 35/06 378/92 |
| 2013/0051524 | A1 | 2/2013 | Sato ............................... 378/62 |
| 2013/0099128 | A1 | 4/2013 | Shikino et al. ............... 250/393 |

(Continued)

FOREIGN PATENT DOCUMENTS

JP    2013-064719    4/2013
JP    2013-106919    6/2013

Primary Examiner — David Porta
Assistant Examiner — Mindy Vu
(74) Attorney, Agent, or Firm — Fitzpatrick, Cella, Harper & Scinto (57) ABSTRACT A radiographic image capturing apparatus, comprising a plurality of sensors arrayed on a substrate, a driving unit, a detection unit and a control unit, wherein the control unit is configured to perform a first control controlling the driving unit so as to repeatedly initialize the plurality of sensors on a row-by-row basis before a start of emission of radiation, and a second control controlling the driving unit so as to interrupt the initialization in response to a detection signal from the detection unit and cause the plurality of sensors to output signals, and the apparatus further comprises a determination unit configured to determine whether or not the detection signal is a signal which was output in response to the start of emission of radiation.

10 Claims, 7 Drawing Sheets

(56) References Cited

U.S. PATENT DOCUMENTS

| | | | |
|---|---|---|---|
| 2013/0264488 A1 | 10/2013 | Sugawara et al. | 250/394 |
| 2013/0320224 A1 | 12/2013 | Sato | 250/394 |
| 2014/0061492 A1* | 3/2014 | Sato | A61B 6/4233 250/393 |
| 2014/0241506 A1 | 8/2014 | Iwashita et al. | 378/91 |
| 2015/0293238 A1 | 10/2015 | Iwashita et al. | 378/114 |

* cited by examiner

RADIOGRAPHIC IMAGE CAPTURING APPARATUS AND CONTROL METHOD THEREOF

BACKGROUND OF THE INVENTION

1. Field of the Invention

The present invention relates to a radiographic image capturing apparatus and a control method thereof.

2. Description of the Related Art

A radiographic image capturing apparatus (hereinafter, referred to as an "apparatus") includes, for example, a plurality of sensors arranged on a substrate, and a driving unit that drives the sensors. Some apparatuses further include a detection unit for detecting the start of emission of radiation so that the apparatuses themselves are capable of determining the start of radiographic image capturing and starting signal readout. The detection unit outputs a detection signal in response to the start of emission of radiation. The driving unit drives each sensor based on the detection signal, and reads out a signal corresponding to the amount of radiation from the sensor.

In the apparatuses, noise caused by shock to the apparatuses, noise caused by electromagnetic waves, and the like (extraneous noise) can occur. Such noise may cause a false detection such as the detection unit outputting a detection signal despite the fact that emission of radiation has not started. For this reason, the configuration in which the apparatus itself determines whether or not radiographic image capturing has started and performs signal readout requires a technique that allows the apparatus itself to determine whether or not the detection signal from the detection unit is a signal that has been appropriately output (a signal that has been output in response to the start of emission of radiation).

Japanese Patent Laid-Open No. 2013-106919 discloses a configuration that informs the user such as a radiologist of the fact that start of emission of radiation has been detected. This configuration enables the user to know whether or not the apparatus appropriately detected the start of emission of radiation, and it is therefore possible to prevent situations such as the user erroneously performs emission of radiation on the apparatus that has made a false detection.

Japanese Patent Laid-Open No. 2013-64719 discloses a configuration in which it is determined whether or not a signal read out from a sensor contains a noise component caused by extraneous noise, and the user is informed of the result of the determination. With this configuration, the user can check the radiographic image or redo radiographic image capturing as appropriate based on the result of the determination, and thus radiographic image capturing can be performed appropriately.

However, neither of Japanese Patent Laid-Open Nos. 2013-106919 and 2013-64719 discloses a technique that allows the apparatus itself to determine whether or not the detection signal from the detection unit is a signal that has been output appropriately.

SUMMARY OF THE INVENTION

The present invention provides a technique that is advantageous in preventing a false detection of start of emission of radiation in a radiographic image capturing apparatus including a detection unit for detecting the start of emission of radiation.

One of the aspects of the present invention provides a radiographic image capturing apparatus, comprising a plurality of sensors arranged so as to form a plurality of rows and a plurality of columns, a driving unit configured to drive the plurality of sensors on a row-by-row basis, a detection unit configured to output a detection signal in response to a start of emission of radiation, and a control unit, wherein the control unit is configured to perform a first control controlling the driving unit so as to repeatedly initialize the plurality of sensors on a row-by-row basis before the start of emission of radiation, and a second control controlling the driving unit so as to interrupt the initialization in response to the detection signal and cause the plurality of sensors to output signals, and the radiographic image capturing apparatus further comprises a determination unit configured to make a determination as to whether or not the detection signal is a signal that was output in response to the start of emission of radiation based on a difference between signals from sensors in a last initialized row in the first control and signals from sensors in a row other than the last initialized row from among the signals from the plurality of sensors output in the second control.

Further features of the present invention will become apparent from the following description of exemplary embodiments with reference to the attached drawings.

BRIEF DESCRIPTION OF THE DRAWINGS

FIGS. 7A1, 7B1, 7A2 and 7B2 are diagrams illustrating an example of a method of driving the radiographic image capturing apparatus when making a determination after dark image readout has been performed.

DESCRIPTION OF THE EMBODIMENTS

Configuration Example of Radiographic Image Capturing System

Figure 1:
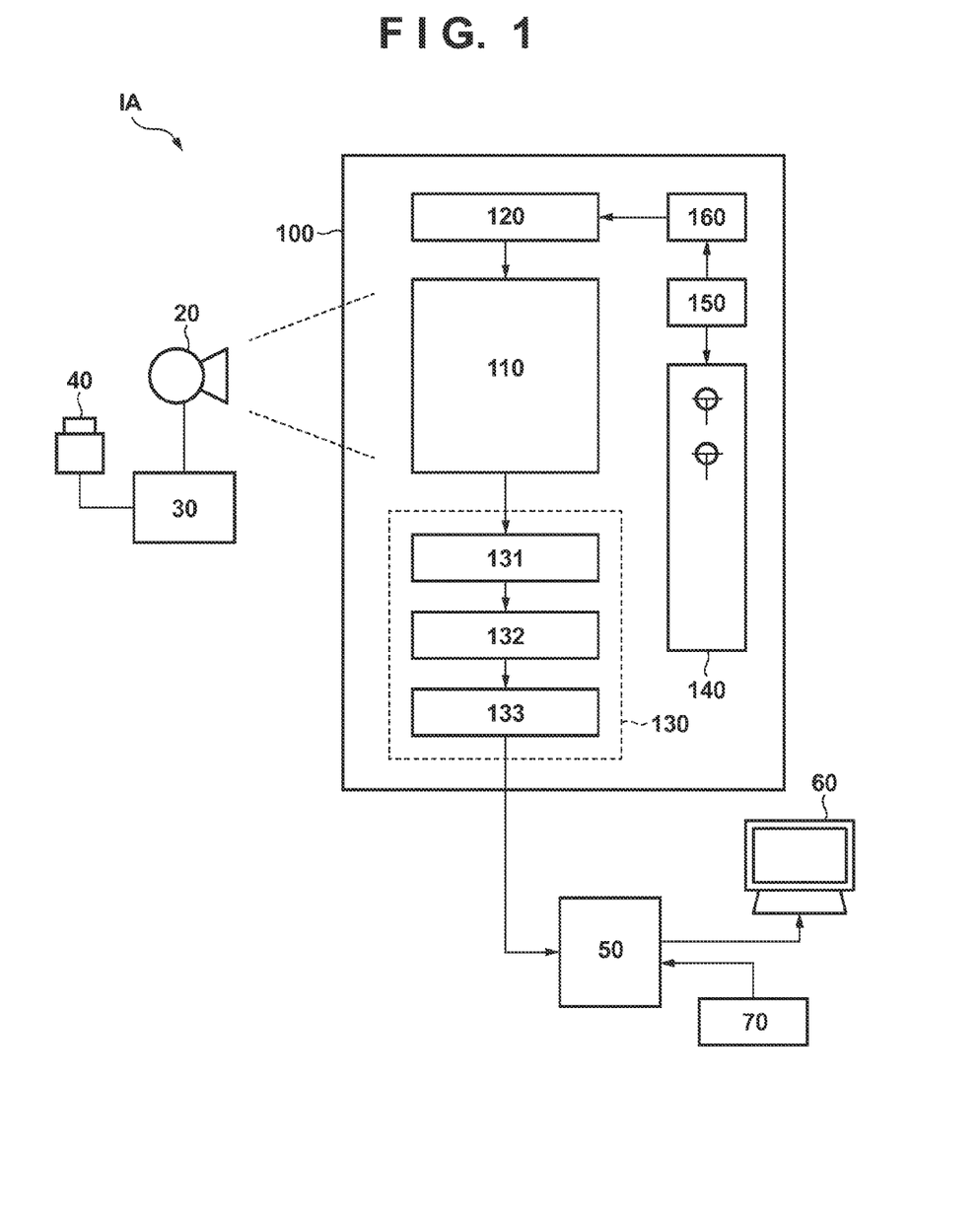
FIG. 1 is a block diagram illustrating an example of an overall configuration of a radiographic image capturing apparatus.

FIG. 1 is a block diagram illustrating a system configuration of a radiographic image capturing apparatus or a radiographic examination apparatus IA (hereinafter, referred to simply as the "apparatus IA") as typified by a radiographic image capturing system. The apparatus IA includes, for example, an image capturing unit 100, and is configured to perform radiographic image capturing by receiving radiation from a radiation source 20. To be specific, a radiation control unit 30 controls the radiation source 20 to generate radiation in response to an exposure switch 40 being pressed. The radiation includes X rays, α rays, β rays, γ rays, and the like.

The radiation from the radiation source 20 passes through a subject to be examined (not shown) such as a patient, and the image capturing unit 100 generates image data based on the radiation. The generated image data is subjected to arithmetic processing by an arithmetic processing unit 50 such as a processor, and then output to a display unit 60 such as a display as a radiographic image. A user such as a radiologist can input information necessary to perform radiographic image capturing such as capture conditions into the arithmetic processing unit 50 by using a terminal 70, as well as saving captured results such as image data and transmitting the image data to another terminal via a communication means such as a wireless LAN.

The image capturing unit 100 includes a sensor array 110, a driving unit 120, a signal processing unit 130, a voltage supply unit 140, a detection unit 150, and a control unit 160.

The sensor array 110 is formed by a plurality of sensors arranged to form a plurality of rows and a plurality of columns. A scintillator (not shown) that converts radiation into light may be provided on the sensor array 110. In this case, sensors such as PIN type photodiodes or MIS type photodiodes are used as the sensors, and the sensors are formed, for example, on a glass substrate by using amorphous silicon. Here, an indirect conversion configuration that converts radiation into light and converts the light into electricity is given as an example, but it is also possible to use a direct conversion configuration that converts radiation (directly) into electric signals.

The driving unit 120 drives (or controls) the sensor array 110, and for example, supplies drive signals (or control signals) to the sensors via signal lines provided in respective rows of the sensor array 110 so as to drive the sensors on a row-by-row basis.

The signal processing unit 130 performs signal processing on the signals (hereinafter, referred to simply as "sensor signals") from the sensors driven by the driving unit 120. The signal processing unit 130 includes, for example, a readout unit 131, an AD converting unit 132, and a data generating unit 133. The readout unit 131 reads a signal from the sensors in each column of the sensor array 110. The AD converting unit 132 performs analog-to-digital conversion (AD conversion) on the read sensor signals. The data generating unit 133 generates image data based on the sensor signals that have undergone AD conversion.

The voltage supply unit 140 supplies a power supply voltage to the units provided in the image capturing unit 100. The voltage supply unit 140 may include, for example, a voltage generating unit (not shown) that receives a power supply voltage from outside and generates a plurality of power supply voltages to be supplied to respective units. The voltage supply unit 140 supplies, to each unit, a power supply voltage required for the unit to appropriately perform operation.

The detection unit 150 detects the start of emission of radiation. For example, the detection unit 150 monitors the state (for example, changes in the amount of current or changes in the voltage value) of the voltage supply unit 140, and outputs a detection signal in response to a change in the state of the voltage supply unit 140 after emission of radiation has started. Of course, the detection unit 150 is not limited to the above-mentioned example and may have another publicly known structure.

The control unit 160 controls the units provided in the image capturing unit 100, and also controls overall operations of the image capturing unit 100. For example, the control unit 160 controls the operations of the driving unit 120 and the signal processing unit 130 by using a control signal. In addition, for example, the control unit 160 is capable of performing synchronization control between units in response to the detection signal from the detection unit 150, and is also capable of, for example, changing the operation mode of the image capturing unit 100.

The configuration of the apparatus IA is not limited to that of the configuration example described above, and the apparatus IA may have a configuration in which a part of the functions of the units described above is performed by another unit, or the apparatus IA may further include a unit having another function.

Figure 2:
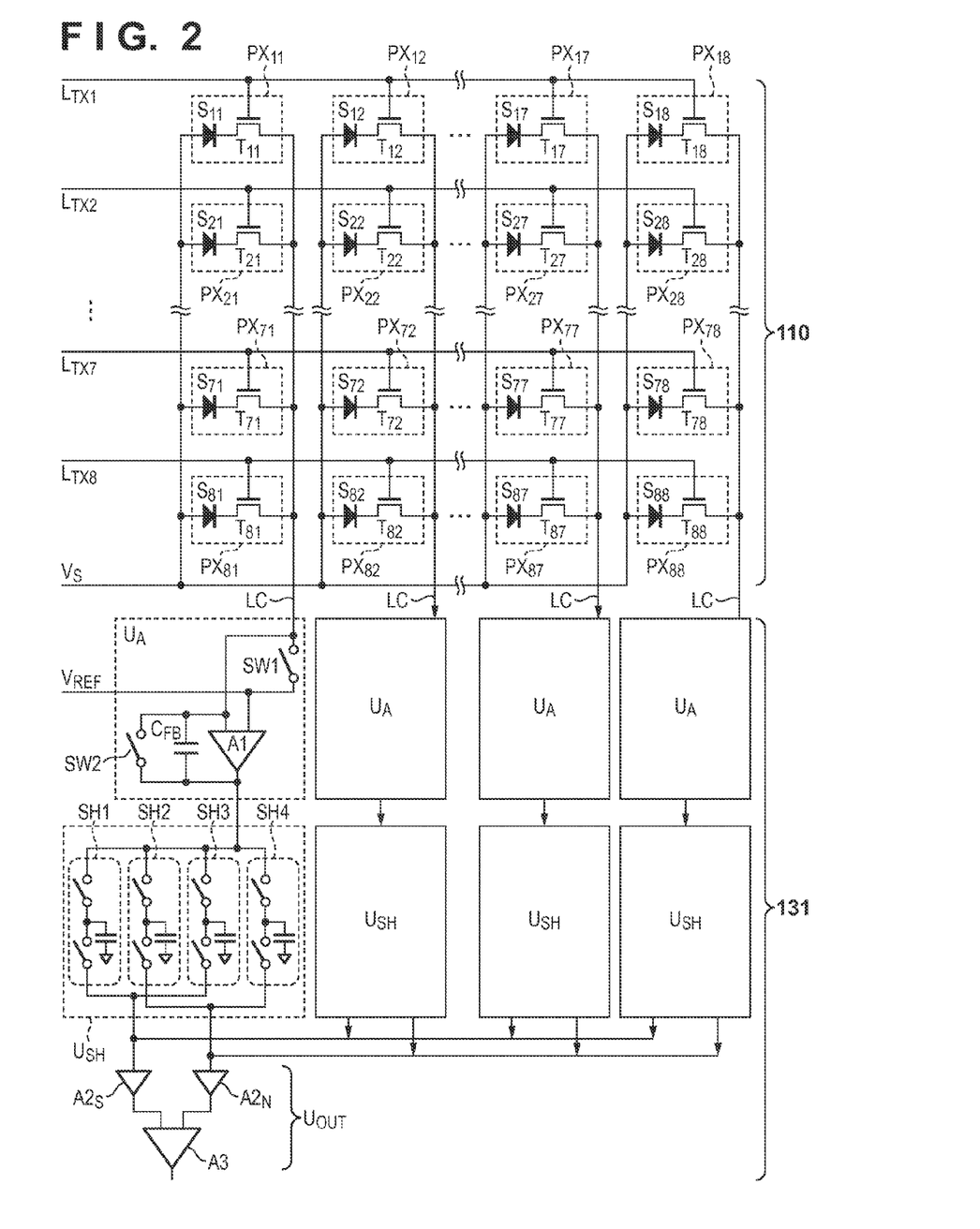
FIG. 2 is a diagram illustrating an example of a configuration of sensors and a readout unit.

FIG. 2 shows a specific configuration example of a part of the sensor array 110 and the readout unit 131 in the apparatus IA. On the sensor array 110, in addition to sensors S ($S_{11}$ to $S_{88}$), corresponding switch elements T ($T_{11}$ to $T_{88}$) are provided. Each switch element T includes, for example, a thin film transistor (TFT), and is connected to the corresponding sensor S. One sensor S and the corresponding one of the switch elements T form one pixel PX ($PX_{11}$ to $PX_{88}$). In order to simplify the description, the diagram shows an example in which the sensor array 110 has 8 rows and 8 columns, but the number of rows and the number of columns are not limited thereto.

Gate terminals of the switch elements T in each row are connected to a signal line $L_{TX}$ ($L_{TX1}$ to $L_{TX8}$) provided to correspond to each row. The signal lines $L_{TX}$ propagate the drive signals from the driving unit 120. With such a configuration, the switch elements T receive the drive signals from the driving unit 120 at the gate terminals.

For example, when the drive signals are low (L) level, the switch elements T are non-conductive, and thus charges generated in the sensors S are accumulated in the sensors S. On the other hand, when the drive signals are high (H) level, the switch elements T are conductive, and thus sensor signals are output from the sensors S to column signal lines LC provided in respective columns via the switch elements T. Signal values of the sensor signals are according to the amount of charges accumulated in the sensors S while the switch elements T are non-conductive.

Also, the sensors S are connected to a bias line $V_S$ at terminals provided on a side opposite to the side on which the switch element T is connected, and the sensors S receive a grounding power supply voltage from the voltage supply unit 140 via the bias line $V_S$. The detection unit 150 described above has, for example, a function of monitoring the amount of current of the bias line $V_S$. Although a detailed description will be given later, before radiographic image capturing is started (or in other words, before emission of radiation is started), the driving unit 120 performs an initialization operation for initializing (resetting) the sensors S, and the detection unit 150 monitors the amount of current of the bias line $V_S$. Upon start of emission of radiation during the initialization operation, the amount of current of the bias line $V_S$ increases. The detection unit 150 can thereby detect the start of emission of radiation.

The readout unit 131 includes, for example, signal amplifying units $U_A$ that amplify sensor signals, sampling units $U_{SH}$ that sample the amplified signals, and an output unit $U_{OUT}$ that outputs the sampled signals.

The signal amplifying units $U_A$ are provided in respective columns, and each signal amplifying unit $U_A$ includes, for example, an amplifier circuit A1 and a feedback capacitance $C_{FB}$. The feedback capacitance $C_{FB}$ is provided so as to connect an output terminal of the amplifier circuit A1 and one of the input terminals of the amplifier circuit A1. A column signal line LC is connected to that input terminal of the amplifier circuit A1. The other input terminal of the amplifier circuit A1 is connected to a reference potential $V_{REF}$. With such a configuration, the signal amplifying unit $U_A$ amplifies the sensor signal.

Also, the signal amplifying unit $U_A$ further includes switches SW1 and SW2. The switch SW1 is provided between the column signal line LC and the reference potential $V_{REF}$, and may be maintained to be conductive while the sensor signal is not read out. Likewise, the switch SW2 is provided in parallel to the feedback capacitance $C_{FB}$ (so as to connect the output terminal of the amplifier circuit A1 and one of the input terminals of the amplifier circuit A1), and is capable of initializing the amplifier circuit A1 by bringing the switch SW2 into a conductive state. The switches SW1 and SW2 may be controlled by the same control signal, or may be controlled separately by mutually different control signals. At this time, the potential of the column signal line LC and the output potential of the signal amplifying units $U_A$ are the reference potential $V_{REF}$.

The sampling units $U_{SH}$ are provided in respective columns, and each sampling unit $U_{SH}$ includes, for example, sample hold circuits SH1 to SH4. The circuits SH1 to SH4 sample signals containing a signal component according to the amount of radiation (hereinafter, referred to as "S signals") or signals containing no signal component (hereinafter, referred to as "N signals"). The N signals are signals corresponding to an offset component caused by the circuit configuration, variation of elements, and the like. For example, the circuit SH1 samples an S signal from the sensors S in odd rows (first, third, . . . , seventh rows), and the circuit SH2 samples an N signal from the sensors S in odd rows. Likewise, the circuit SH3 samples an S signal from the sensors S in even rows (second, fourth, . . . , eighth rows), and the circuit SH4 samples an N signal from the sensors S in even rows. The sampling unit $U_{SH}$, when performing a readout operation of reading sensor signals, for example, alternately performs sampling of sensor signals in odd rows and sampling of sensor signals in even rows.

The output unit $U_{OUT}$ sequentially outputs the S signals and the N signals from the sampling unit $U_{SH}$ to the AD converting unit 132. The output unit $U_{OUT}$ includes, for example, amplifier circuits $A2_S$, $A2_N$ and A3. The amplifier circuit $A2_S$ amplifies the S signals, and the amplifier circuit $A2_N$ amplifies the N signals. The amplifier circuits $A2_S$ and $A2_N$ may be, for example, source follower circuits that perform a source follower operation upon receiving the signals from the sampling unit $U_{SH}$. The amplifier circuit A3 amplifies a difference between the S signals from the amplifier circuit $A2_S$ and the N signals from the amplifier circuit $A2_N$, and outputs the resultant.

With the configuration described above, the readout unit 131 performs correlated double sampling processing (CDS processing) of the sensor signals. After that, the sensor signals are subjected to AD conversion by the AD converting unit 132, and image data is generated by the data generating unit 133 based on the sensor signals that have undergone AD conversion. The configuration of the readout unit 131 is not limited to that of the configuration example described above, and for example, a signal or data corresponding to a difference between the S signals and the N signals may be obtained outside the readout unit 131. Also, the circuit configuration of the readout unit 131 may be partially changed, or the readout unit 131 may further include a circuit that performs another signal processing.

First Embodiment

A first embodiment will be described with reference to FIGS. 3A to 5.

Figure 3A:
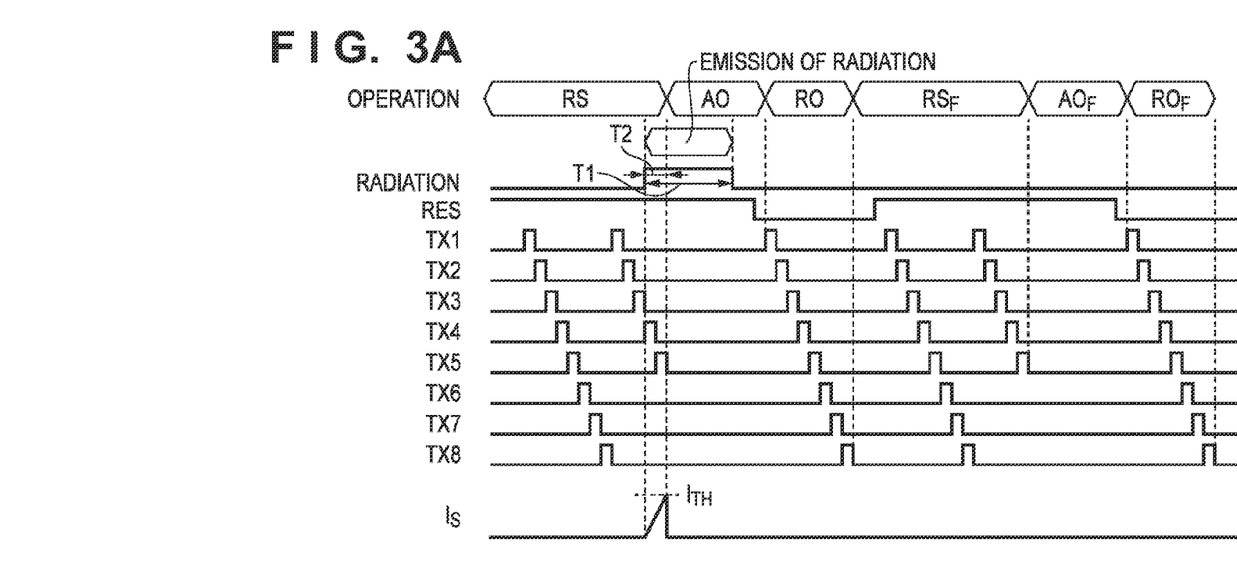
FIGS. 3A and 3B are diagrams illustrating an example of a sensor driving method.

FIG. 3A shows an operation timing chart for driving the sensors S. The diagram shows operation mode, radiation emission state, a control signal RES, drive signals TX1 to TX8 and the amount of current $I_S$, with the horizontal axis indicating time. The control signal RES is a signal for controlling the switches SW1 and SW2, and as a result of the control signal RES being set to H, the switches SW1 and SW2 become conductive, and the signal amplifying units $U_A$ are initialized. The drive signals TX1, . . . are drive signals that drive the signal lines $L_{TX1}$, . . . . The amount of current $I_S$ is the amount of current flowing through the bias line $V_S$.

At the time of radiographic image capturing, the apparatus IA performs, for example, an initialization operation RS before radiation is emitted, and in response to the start of emission of radiation, interrupts the initialization operation RS so as to perform an accumulation operation AO and a readout operation RO. In this way, the apparatus IA performs a first readout that acquires image data based on the emitted radiation.

After that, the apparatus IA performs an initialization operation $RS_F$, an accumulation operation $AO_F$ and a readout operation $RO_F$ in the same manner as in the above-described operations RS, AO and RO while radiation is not emitted. In this way, the apparatus IA performs a second readout that acquires image data while radiation is not emitted. To be specific, in each sensor S, charges are generated and accumulated due to dark current or the like even when radiation is not emitted. The image data is formed based on the sensor signals according to the charges. Then, as a result of correction processing on the image data obtained through the above-described first readout by using the image data obtained through this second readout, the noise component due to dark current or the like is removed. The image data is also referred to as the "dark image data", and the second readout is also referred to as the "dark image readout".

First, in the initialization operation RS, initialization of the plurality of sensors S is repeatedly performed on a row-by-row basis. To be specific, in the initialization operation RS, the control signal RES is set to H, and thus the above-described switches SW1 and SW2 are maintained to be conductive. Meanwhile, the drive signals TX1 to TX8 are sequentially turned to H so as to sequentially make the switch elements T in the first to eighth rows conductive. The charges generated in the sensors S are thereby discharged to the reference potential $V_{REF}$ via the column signal lines LC. In this way, the sensors S in each row are sequentially initialized.

Upon start of emission of radiation, the amount of charges generated in each sensor S increases. Accordingly, the amount of charges (here, electrons) discharged to the reference potential $V_{REF}$ in the initialization operation RS increases, and the amount of charges (here, positive holes) flowing through the bias line $V_S$, or in other words, the amount of current $I_S$ also increases. The above-described detection unit 150 can detect the start of emission of radiation based on, for example, the amount of current $I_S$ or changes in the amount of current $I_S$, and output a detection signal.

The amount of current $I_S$ is obtained primarily by time-integrating the charges generated according to the radiation, and thus the amount of current $I_S$ increases at a substantially constant rate over time after the start of emission of radiation. Then, when the amount of current $I_S$ reaches a value greater than a predetermined threshold value $I_{TH}$, the detection unit 150 determines that emission of radiation has started, and outputs a detection signal. In this example, the detection signal is output while the sensors S in the fifth row are initialized. Then, in response to the detection signal, the initialization operation RS is interrupted, and an accumulation operation AO is started.

In this example, an embodiment is shown in which the detection unit 150 detects the start of emission of radiation based on the amount of current $I_S$, but the method of detecting the start of emission is not limited thereto. The detection unit 150 may be configured to, for example, detect the start of emission based on the amount of current of the reference potential $V_{REF}$ or changes in the amount of current of the reference potential $V_{REF}$, or may be configured to detect the start of emission based on the signal of another line (power supply line or signal line) connected to the sensors S. Alternatively, another sensor that is different from the plurality of sensors S may be provided so as to detect the start of emission of radiation based on the signal from that sensor.

Also, in the initialization operation RS shown in the diagram, one round (the first to eighth rows) of initialization is performed, and the next round of initialization is interrupted at the fifth row, but the initialization of the sensors S in each row is repeatedly performed until emission of radiation starts. Also, with respect to the initialization operation RS, here, an embodiment in which the first to eighth rows are initialized in this order is shown as an example, but the order in which the rows are initialized is not limited thereto.

In the accumulation operation AO, the switch elements T are maintained to be non-conductive for a predetermined period of time from the interruption of the initialization operation RS until the end of the emission of radiation. By doing so, charges are accumulated in each sensor S in an amount according to the amount of radiation emitted.

In the readout operation RO, the control signal RES is turned to L so as to bring the signal amplifying units $U_A$ into an active state, and the drive signals TX1 to TX8 are sequentially turned to H so as to sequentially make the switch elements T in the first to eighth rows conductive. Through this, the signals corresponding to the charges generated in the sensors S are sequentially read out by the readout unit 131, and the first readout for acquiring image data based on the emitted radiation ends.

After that, a second readout for acquiring image data while radiation is not emitted (or in other words, dark image readout for acquiring dark image data) is started. To be specific, the control signal RES is again turned to H so as to perform an initialization operation $RS_F$ and an accumulation operation $AO_F$, and after that, the control signal RES is again turned to L so as to perform a readout operation $RO_F$. As described above, the series of operations $RS_F$, $AO_F$ and $RO_F$ are performed while radiation is not emitted.

The initialization operation $RS_F$ may, after the sensors S in all of the rows have been initialized at least once, be interrupted at the same row (here, the fifth row) as the row at which the initialization operation RS was interrupted, as in the initialization operation RS described above. In order to simplify the description, an embodiment is described in which the initialization operation $RS_F$ is interrupted after one round of initialization (the first to eighth rows) has been performed, but the initialization operation $RS_F$ may be interrupted after two or more rounds of initialization have been performed.

The accumulation operation $AO_F$ is preferably performed such that the duration for which the switch elements T are maintained to be non-conductive is equal to the duration for which the switch elements T are maintained to be non-conductive in the above-described accumulation operation AO. After that, in the readout operation $RO_F$, signals according to the charges accumulated in the sensors S while radiation is not emitted are sequentially read out.

Figure 3B:
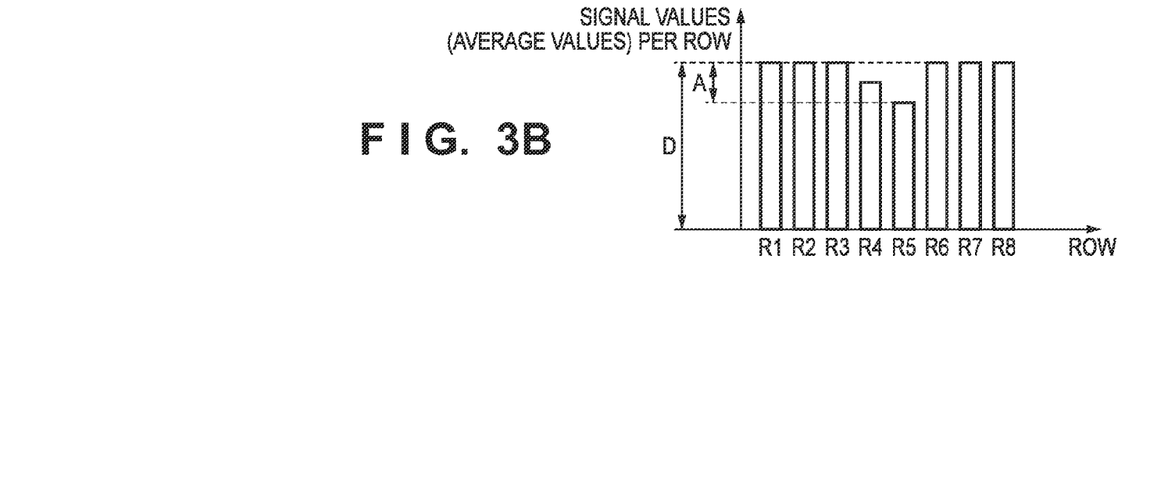

FIG. 3B shows the average value of the sensor signals in each row in the example shown in FIG. 3A. The horizontal axis indicates row number (R1 to R8). Here, in order to facilitate the understanding, a case is considered where radiation is uniformly emitted (to be specific, the radiation to be detected does not include internal body information of the subject to be examined). The sensor signals may include a signal component according to the amount of radiation and a noise component according to the duration from when the final initialization is performed in the initialization operation RS until when driving starts in the readout operation RO. Accordingly, when radiation is uniformly emitted, the sensor signals of the rows are substantially equal.

In this example, emission of radiation is started upon initialization of the fourth row, and the start of emission of radiation is detected upon initialization of the fifth row. Accordingly, in the initialization of the fourth to fifth rows, a part of the signal component corresponding to the amount of radiation emitted is initialized along with the noise component corresponding to the charges accumulated in the sensors S while radiation is not emitted. As a result, as shown in FIG. 3B, the signal values of the fourth and fifth rows (R4 and R5) are smaller than the signal values of the other rows. For example, referring to the fifth row, which was an initialization target when the start of emission of radiation was detected (to be specific, when the detection signal was output by the detection unit 150), a difference A is generated in the signal value with respect to another row (R1 to R3 and R6 to R8) for which initialization was not performed during emission of radiation. The difference A can be represented by $A = D \times T2/T1$, where D indicates the signal value of another row for which initialization was not performed during emission of radiation, T1 indicates radiation emission time, and T2 indicates the duration from when emission of radiation is started until when the start of emission is detected.

As described above, the amount of current $I_S$ is obtained primarily by time-integrating the charges generated according to the radiation. Accordingly, if the threshold value $I_{TH}$ is a fixed value, the difference A is substantially constant, and if the radiation intensity is constant, the duration T2 is also substantially constant.

Here, it is possible to determine whether or not the result of detection performed by the detection unit 150 (or in other words, the output of the detection signal) is correct, based on the difference A in the sensor signals obtained in the readout operation RO. The difference A is caused due to the initialization operation RS during the time from the start of emission of radiation until the detection of the start of emission. Accordingly, for example, if the difference A is greater than a predetermined value, it is possible to determine that the detection signal was appropriately output (the detection by the detection unit 150 was correct). In other words, it is possible to determine that the detection signal is a signal that was output in response to the start of emission of radiation.

Although details will be described later, if, on the other hand, the difference A is smaller than the predetermined value, or if the difference A is substantially 0, it is possible to determine that the detection signal was erroneously output (or in other words, a false detection).

The above-described determination (hereinafter, also referred to simply as the "determination") is preferably made based on a difference between the signal value of the fifth row, which was an initialization target when the detection signal was output, and the signal value D of another row. The other row may be, for example, the sixth row, which is the row next to the firth row, or may be the row (the seventh or eighth row) after the sixth row. However, with respect to the rows before the fifth row, in the case of the above example, it is preferable to use the signal value of any one of the first to third rows because, in the fourth row, a part of the signal component is lost by initialization at the start of emission of radiation. In other words, it is preferable to use the signal value of a row before the row, which was an initialization target when a detection signal was output, by a predetermined number (the number may be, for example, pre-set by the user or calculated based on the amount of radiation emitted). Alternatively, the determination may be made based on a difference between the signal value of the fifth row, which was an initialization target, and the average value of the signal values of all of the rows excluding the fifth row.

Radiographic image capturing is performed based on the radiation that has passed through the subject, and thus the radiation that actually enters the image capturing unit 100 is not uniform, and may include the internal body information of the subject to be examined. Accordingly, as shown in FIG. 3B, the determination is preferably made based on the average values of the sensor signals of the rows. Alternatively, the determination may be made based on medians or modes, instead of the average values, or may be made based on standard deviations or the like, or statistic results of the sensor signals of the rows.

Also, for example, it is often the case that radiation passes through the subject and enters a central area (for example, the third to fourth columns in the example shown in FIG. 2) in the sensor array 110, whereas the radiation enters an end area (for example, the first or eighth column) without passing through the subject. For this reason, the determination may be made based on, for example, the sensor signals from the sensors S of the end area in the sensor array 110. Alternatively, the determination may be made based on weighted average values of the sensor signals from the sensors S in the end area and the sensor signals from the sensors S in the central area. With the weighted average values, for example, a coefficient for use in the sensor signals from the sensors S in the end area is preferably set to be greater than a coefficient for use in the sensor signals from the sensors S in the central area.

The above-described determination may be made by, for example, the arithmetic processing unit 50, but the configuration of the unit that makes the determination is not limited to that of the present embodiment. For example, the image capturing unit 100 may further include a determination unit for making the determination, or a part of the units of the signal processing unit 130 or another unit that is not shown in the diagram may have a function of making the determination. Also, the image capturing unit 100 may further include a unit configured to store information indicating which row of sensors S was initialized when the detection signal was output based on the detection signal from the detection unit 150 and the drive signal TX from the driving unit 120 or the control signal from the control unit 160. The unit that makes the determination can make the determination by specifying a row, which was the initialization target when the detection signal was output, based on the above information, comparing the signal value of the specified row with the signal value of a row other than the specified row, and making the determination based on the difference.

Figure 4A:
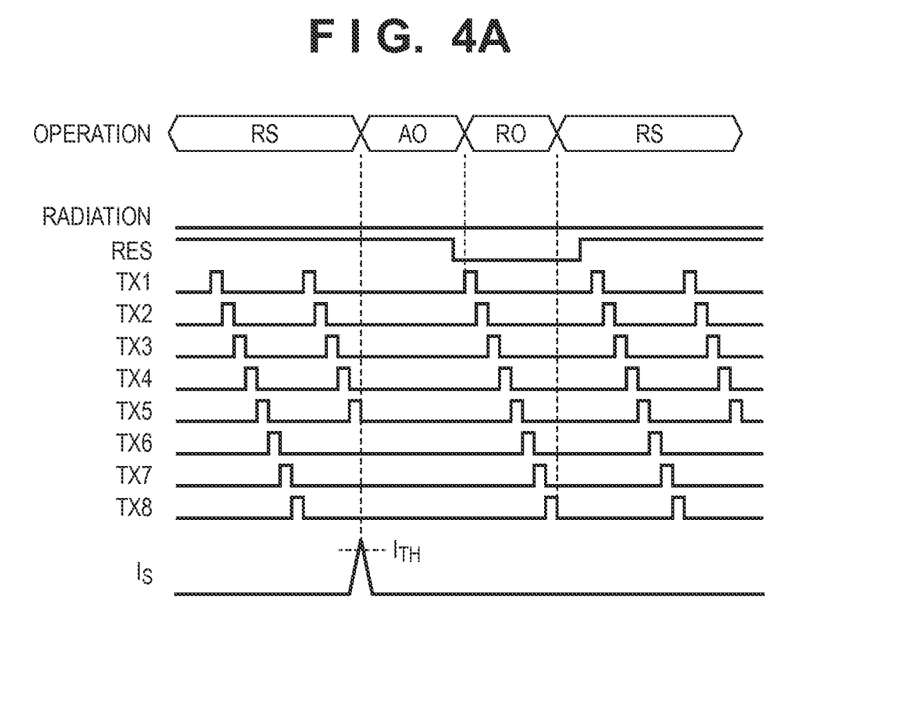
FIGS. 4A and 4B are diagrams illustrating an example of a method of driving the radiographic image capturing apparatus when a false detection of start of emission of radiation is made.

FIG. 4A is an operation timing chart when the start of emission of radiation is falsely detected, which is shown in the same manner as in FIG. 3A. The false detection results from extraneous noise such as noise caused by shock to the apparatus IA and noise caused by electromagnetic waves, and to be specific, the false detection occurs as a result of the detection unit 150 outputting a detection signal due to extraneous noise despite the fact that emission of radiation has not started. FIG. 4A shows an example in which extraneous noise is introduced while the sensors S in the fifth row are initialized in the initialization operation RS, the amount of current $I_S$ thereby becomes greater than the threshold value $I_{TH}$ ($I_S>I_{TH}$), then a detection signal is output, and the initialization operation RS is thereby interrupted. After interruption of the initialization operation RS, an accumulation operation AO and a readout operation RO are performed in the same manner as described above.

Figure 4B:
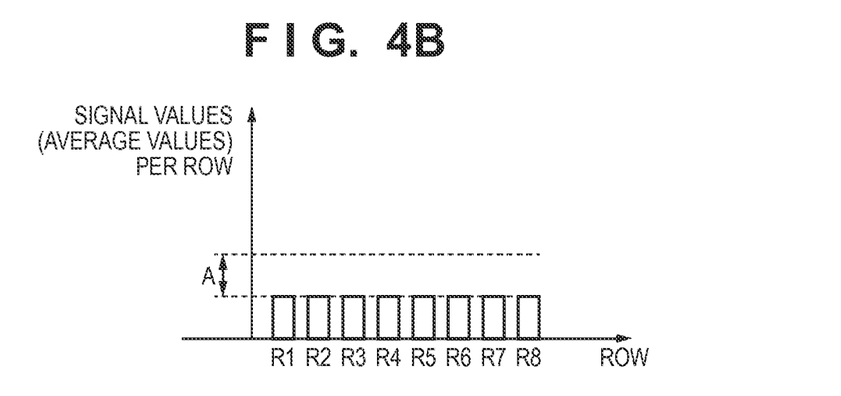

FIG. 4B shows the average values per row of the sensor signals obtained in the readout operation RO, which is shown in the same manner as in FIG. 3B. In the above-described example of false detection, despite the fact that emission of radiation has not started, a detection signal has been output. Accordingly, the signal value of each row indicates a noise component corresponding to the charges accumulated in the sensors S while radiation is not emitted, and the sensor signal of each row does not include the signal component. Accordingly, in the above-described example of false detection, a difference between the signal value of the fifth row, which was the initialization target when the detection signal was output, and the signal value of a row other than the fifth row is substantially 0. As described with reference to FIGS. 3A and 3B, if the threshold value $I_{TH}$ is a fixed value, the difference A in the signal value when the detection signal is appropriately output is substantially constant. Accordingly, if the difference in the signal value in the above-described example of false detection is smaller than a predetermined value (substantially 0 in this example), it is possible to determine that the detection signal is not a signal that was output in response to the start of emission of radiation.

Figure 5:
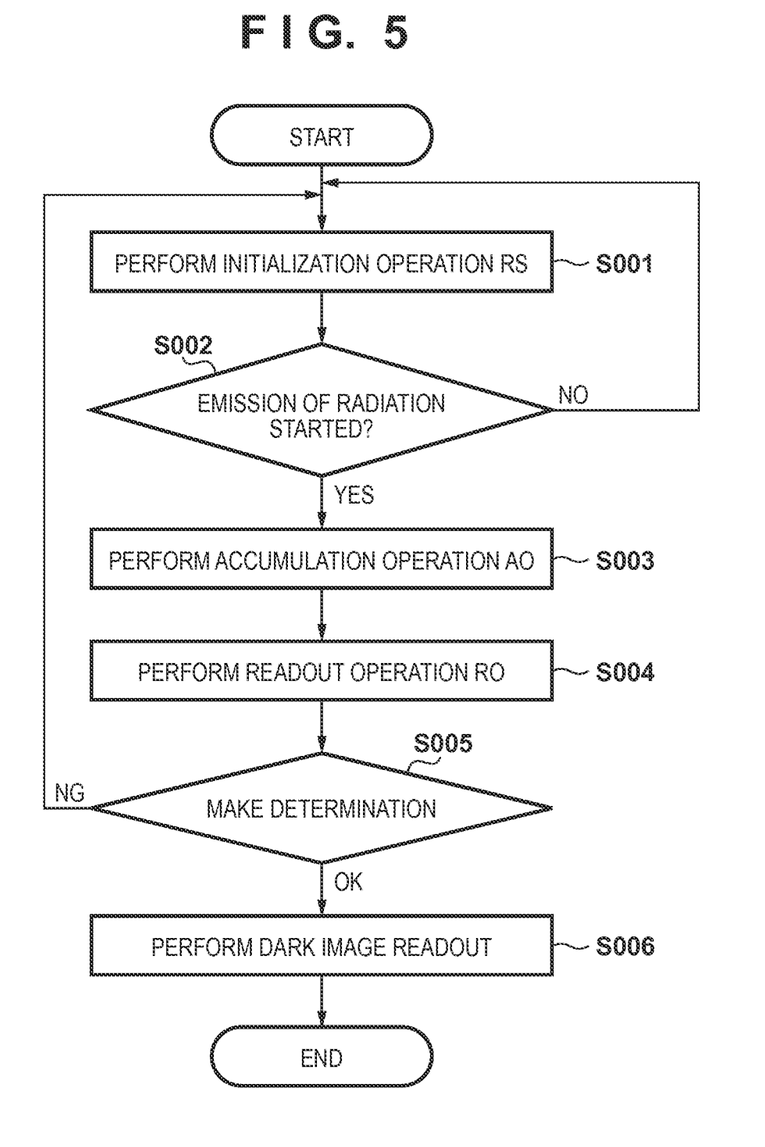
FIG. 5 is a diagram illustrating an example of a method of driving the radiographic image capturing apparatus.

FIG. 5 shows a flowchart illustrating operations of the apparatus IA. In step S001 (hereinafter, referred to simply as "S001", and the same applies to the other steps), the above-described initialization operation RS is performed. In S002, it is determined whether or not emission of radiation has been started. To be specific, the detection unit 150 monitors the amount of current $I_S$ of the bias line $V_S$, and when the amount of current $I_S$ reaches a value greater than the threshold value $I_{TH}$, the detection unit 150 determines that emission of radiation has started and outputs a detection signal. If the detection signal is not output, the processing returns to S001, and if the detection signal is output, the processing proceeds to S003. In S003, the above-described accumulation operation AO is performed. The accumulation operation AO may be performed until the end of emission of radiation, but may be terminated if the emission of radiation does not end even after a predetermined period of time has passed. After that, in S004, the above-described readout operation RO is performed.

In S005, a determination is made based on a difference between the signal value of the row that was the initialization target when the detection signal was output and the signal value of a row other than the initialization target row among the sensor signals obtained in the readout operation RO as to whether or not the detection signal is a signal that was output in response to the start of emission of radiation. If it is determined as a result of the determination that the detection signal is a signal that was output in response to the start of emission of radiation (if the result of detection by the detection unit 150 is correct), the processing proceeds to S006.

If, on the other hand, it is determined that the detection signal is not a signal that was output in response to the start of emission of radiation (if the result of detection by the detection unit 150 is incorrect), the processing returns to S001. At this time, a notification indicating the occurrence of the false detection may be issued to a user such as a radiologist at the same time when the processing returns to S001. The user thereby can check whether there is anything that causes noise, such as an operating apparatus, near the apparatus IA. The notification may be made by, for example, being displayed on the display unit 60 such as a display, and it is also possible to provide a predetermined notification unit in the image capturing unit 100 so that the notification is made by the notification unit. Also, the notification may be made by outputting the content of the notification by using characters or sound, or may be made by flashing or illuminating an LED or the like.

In S006, the above-described dark image readout is performed. To be specific, the initialization operation $RS_F$, the accumulation operation $AO_F$ and the readout operation $RO_F$ are performed in the same manner as the operations RS, AO and RO (S001, S003 and S004) were performed. After that, correction processing is performed on the image data obtained in the readout operation RO in S004 by using the dark image data obtained in this step.

As described above, according to the driving method and control method of the present embodiment, the apparatus IA performs the initialization operation RS until a detection signal is output from the detection unit 150, and performs the accumulation operation AO and the readout operation RO in response to the detection signal being output. After that, the apparatus IA analyzes the signals obtained in the readout operation RO, and determines whether or not the detection signal is a signal that was output in response to the start of emission of radiation (whether or not the result of detection by the detection unit 150 is correct). Then, if it is determined that the detection signal is not a signal that was output in response to the start of emission of radiation (or in other words, a false detection), the apparatus IA again performs the initialization operation RS so as to prepare for the next radiographic image capturing. The determination is made based on a difference between the signal value of the row that was the initialization target when the detection signal was output and the signal value of a row other than the initialization target row. According to the method of detecting the start of emission of radiation according to the present embodiment, the difference between the signal values is substantially constant, and thus the determination may be made based on the magnitude relationship between the signal value difference and a predetermined value.

As described above, the present embodiment is advantageous in preventing a false detection in a radiographic image capturing apparatus including a detection unit for detecting the start of emission of radiation.

Second Embodiment

A second embodiment will be described with reference to FIGS. 6 to 7B2. In the first embodiment described above, an embodiment was described in which in the case of a false detection, the processing returns to the initialization operation RS without performing the dark image readout (the accumulation operation $AO_F$ and the readout operation $RO_F$). However, the present invention is not limited to this embodiment, and an embodiment is possible in which a dark image readout is performed, and it is determined whether or not the result of detection by the detection unit 150 is correct while performing correction processing based on dark image data obtained through the dark image readout.

Figure 6:
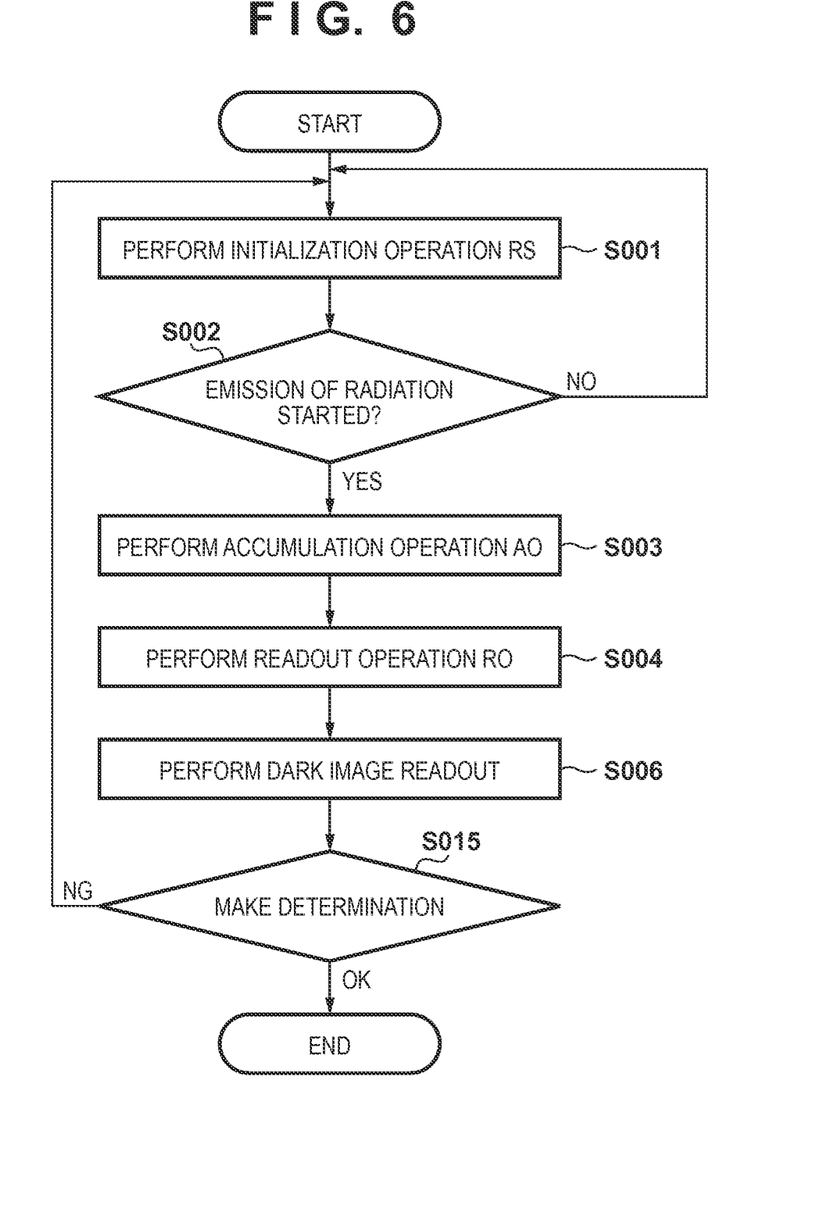
FIG. 6 is a diagram illustrating an example of a method of driving the radiographic image capturing apparatus.

FIG. 6 is a flowchart illustrating operations of the radiographic image capturing apparatus, which is shown in the same manner as in the first embodiment (FIG. 5). In the flowchart, the same reference numerals are given to the same steps as those of FIG. 5. That is, steps S001 to S004 are the same as those shown in FIG. 5. After that, in S006, a dark image readout is performed. Then, correction processing is performed on the image data obtained in the readout operation RO in S004 by using the dark image data obtained in the dark image readout in S006.

After that, in S015, it is determined whether or not the result of detection by the detection unit 150 is correct (to be specific, whether or not the detection signal is a signal that was output in response to the start of emission of radiation) by using the image data that has undergone the correction processing. To be specific, the determination is made based on a difference between a portion corresponding to the row that was the initialization target when the detection signal was output and a portion corresponding to a row other than the initialization target row in the image data that has undergone the correction processing.

Figures 7A, 7B:
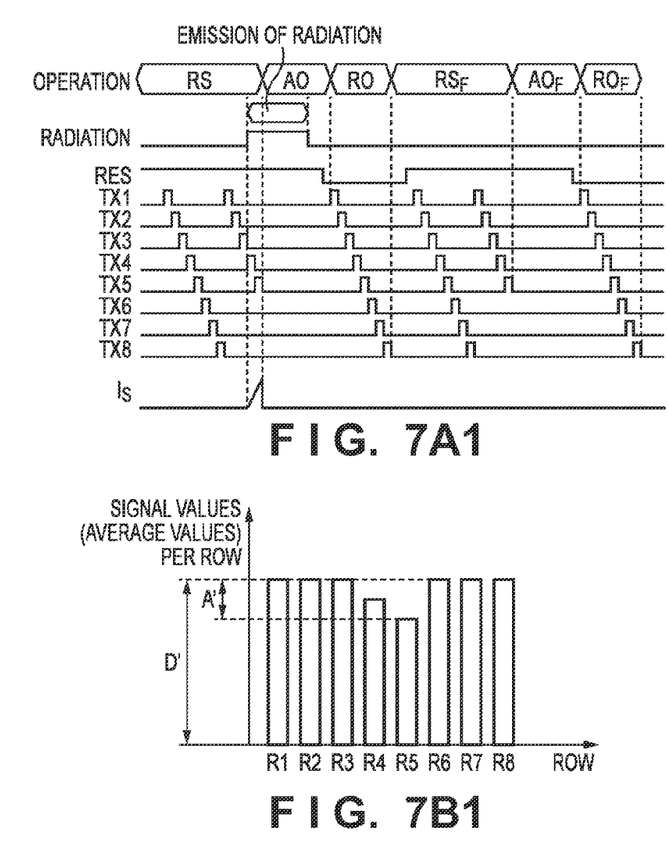

FIGS. 7A1 and 7A2 show operation timing charts according to the present embodiment, which is shown in the same manner as in the first embodiment (FIGS. 3A and 4A). FIG. 7A1 shows an operation timing chart in the case where the result of detection by the detection unit 150 is correct, and FIG. 7B1 shows data values (average values) per row of the image data obtained at that time. FIG. 7A2 shows an operation timing chart in the case where the result of detection by the detection unit 150 is incorrect (or in other words, a false detection), and FIG. 7B2 shows data values (average values) per row of the image data obtained at that time.

In the case where the result of detection by the detection unit 150 is correct, as shown in FIG. 7A1, the detection signal is output while the sensors S in the fifth row are initialized in the initialization operation RS, and the initialization operation RS is thereby interrupted. After that, the operations AO and RO are sequentially performed as in the same manner as described above, and furthermore, the series of operations $RS_F$, $AO_F$ and $RO_F$ of dark image readout are sequentially performed. As a result, as shown in FIG. 7B1, in the image data that has undergone correction processing, a difference A' is generated in the data value between a portion corresponding to the fifth row (R5) and a portion corresponding to another row (R1 to R3 and R6 to R8) for which initialization was not performed during emission of radiation. Data value D' shown in the diagram is a data value of the portion corresponding to the other row (R1 to R3 and R6 to R8), and the data value D' corresponds to a value obtained by subtracting a signal value corresponding to a noise component due to dark current or the like from the above-described signal value D, and A' is equal to A (A'=A).

Figures 7A, 7B:
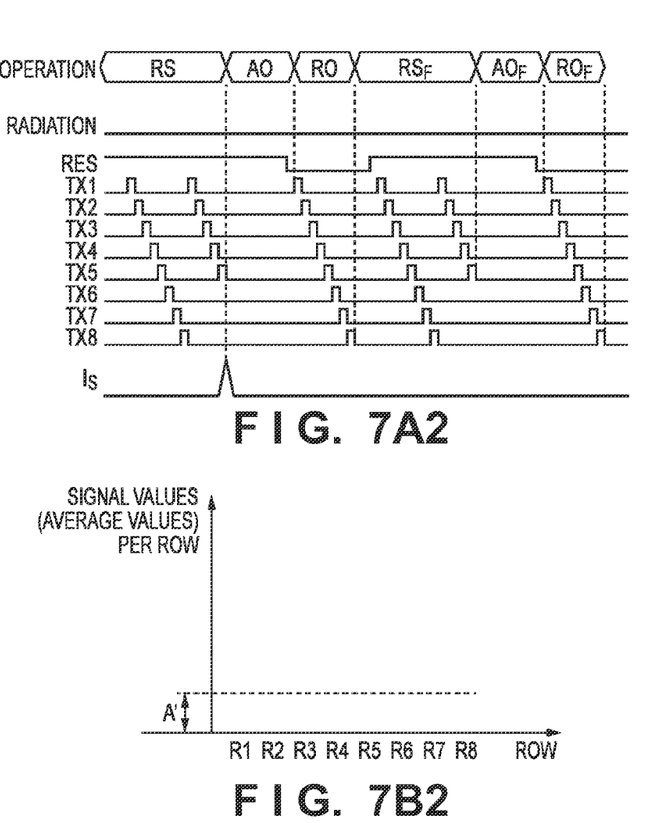

On the other hand, in the case of a false detection, as shown in FIG. 7A2, the detection signal is output while the sensors S in the fifth row are initialized in the initialization operation RS, and the initialization operation RS is thereby interrupted. In the present embodiment, after that, the operations AO and RO are performed in the same manner as described above, and then a series of operations $RS_F$, $AO_F$ and $RO_F$ of dark image readout are sequentially performed without returning to the initialization operation RS.

In the above-described example of false detection, the sensor signals of the rows obtained in the signal readout RO do not include a signal component, and thus as shown in FIG. 7B2, the data values of the finally obtained image data are substantially 0. In the image data, the difference between the data value of a portion corresponding to the fifth row (R5) and the data value of a portion corresponding to a row other than the fifth row is substantially 0.

According to the present embodiment, even after correction processing using dark image data has been performed, it is possible to make a determination as to whether or not the result of detection by the detection unit 150 is correct. Accordingly, the present embodiment also provides the same effects as those of the first embodiment described above. Here, an example was described in which the dark image readout is performed, but the above-described determination can also be made in the same manner after another signal processing or data processing has been performed.

Two preferred embodiments have been described thus far, but the present invention is not limited thereto, and may be partially changed according the purpose, or the features of the embodiments may be combined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-108443, filed May 26, 2014, which is hereby incorporated by reference herein in its entirety.

What is claimed is:

1. A radiographic image capturing apparatus comprising:
a plurality of sensors arranged so as to form a plurality of rows and a plurality of columns;
a driving unit configured to drive the plurality of sensors on a row-by-row basis;
a detection unit configured to output a detection signal in response to a start of emission of radiation; and
a control unit,
wherein the control unit is configured to perform:
a first control controlling the driving unit so as to repeatedly initialize the plurality of sensors on a row-by-row basis before the start of emission of radiation; and
a second control controlling the driving unit so as to interrupt the initialization in response to the detection signal and cause the plurality of sensors to output signals, and
the radiographic image capturing apparatus further comprises a determination unit configured to make a determination as to whether or not the detection signal is a signal that was output in response to the start of emission of radiation based on a difference between signals from sensors in a last initialized row in the first control and signals from sensors in a row other than the last initialized row from among the signals from the plurality of sensors output in the second control.

2. The radiographic image capturing apparatus according to claim 1,
wherein the determination unit is configured to make the determination based on a difference between an average value of the signals from the sensors in the last initialized row and an average value of the signals from the sensors in a row other than the last initialized row.

3. The radiographic image capturing apparatus according to claim 1,
wherein the control unit is configured to further perform, before or after the first control and the second control, a third control controlling the driving unit such that the plurality of sensors output signals corresponding to charges generated in the plurality of sensors while radiation is not emitted to the plurality of sensors, and
the radiographic image capturing apparatus further comprises an output unit configured to output differences between the signals from the plurality of sensors output in the second control and the signals from the plurality of sensors output in the third control as image data.

4. The radiographic image capturing apparatus according to claim 1, further comprising a notification unit configured to notify a user of a result of the determination made by the determination unit.

5. The radiographic image capturing apparatus according to claim 4, further comprising a radiation source configured to generate radiation, and a display unit,
wherein the notification unit is configured to output content of the notification to the display unit.

6. The radiographic image capturing apparatus according to claim 1, further comprising a radiation source configured to generate radiation.

7. A radiographic image capturing apparatus comprising:
a plurality of sensors arranged so as to form a plurality of rows and a plurality of columns;
a driving unit configured to drive the plurality of sensors on a row-by-row basis; and
a detection unit configured to output a detection signal in response to a start of emission of radiation; and
a control unit,
wherein the control unit is configured to perform:
a first control controlling the driving unit so as to repeatedly initialize the plurality of sensors on a row-by-row basis before the start of emission of radiation;

a second control controlling the driving unit so as to interrupt the initialization in response to the detection signal and cause the plurality of sensors to output signals; and a third control controlling the driving unit such that the plurality of sensors output signals corresponding to charges generated in the plurality of sensors while radiation is not emitted to the plurality of sensors, the third control being performed before or after the first control and the second control, and the radiographic image capturing apparatus further comprises:

an output unit configured to output differences between the signals from the plurality of sensors output in the second control and the signals from the plurality of sensors output in the third control as image data; and a determination unit configured to make a determination as to whether or not the detection signal is a signal that was output in response to the start of emission of radiation based on a difference between a first portion corresponding to a last initialized row in the first control and a second portion corresponding to a row other than the last initialized row in the image data output by the output unit.

8. The radiographic image capturing apparatus according to claim 7, wherein the determination unit is configured to make the determination based on a difference between an average value in the first portion and an average value in the second portion.

9. A control method for controlling a radiographic image capturing apparatus, the radiographic image capturing apparatus including a plurality of sensors arranged so as to form a plurality of rows and a plurality of columns, and a detection unit configured to output a detection signal in response to a start of emission of radiation, the control method comprising:

a first step of repeatedly initializing the plurality of sensors on a row-by-row basis before a start of emission of radiation;

a second step of interrupting the initialization in response to the detection signal and driving the plurality of sensors such that the plurality of sensors output signals; and a third step of making a determination as to whether or not the detection signal is a signal that was output in response to the start of emission of radiation based on a difference between signals from sensors in a last initialized row in the first step and signals from sensors in a row other than the last initialized row from among the signals from the plurality of sensors output in the second step.

10. The control method for controlling a radiographic image capturing apparatus according to claim 9, further comprising a fourth step of notifying a user of a result of the determination made in the third step.

* * * * *